(No Model.)

A. H. REID.
MILK COOLER.

No. 283,921. Patented Aug. 28, 1883.

Witnesses.
Sidney P. Hollingsworth.
Walter S. Dodge.

Inventor:
A. H. Reid
By Dodge & Son
Attys.

UNITED STATES PATENT OFFICE.

ALBAN H. REID, OF PHILADELPHIA, PENNSYLVANIA.

MILK-COOLER.

SPECIFICATION forming part of Letters Patent No. 283,921, dated August 28, 1883.

Application filed January 17, 1881. (No model.)

*To all whom it may concern:*

Be it known that I, ALBAN H. REID, of Philadelphia, in the county of Philadelphia and State of Pennsylvania, have invented certain Improvements in Milk-Coolers, of which the following is a specification.

My invention relates to that class of milk-coolers in which the milk is contained in a vessel surrounded on all sides by a cooling medium or agent; and the improvement consists, essentially, in the combination of an external body or case, an internal milk-vessel, and a water-jacket or lining surrounding the milk-vessel and inclining inward at one end to meet the base of the same for the double purpose of affording a space within the body for the outlet-neck and of permitting the water or other cooling medium to surround substantially the entire milk-vessel, and in providing the milk-vessel, arranged as above, with an outlet-neck lying between the lining and the door of the outer body.

Figure 1:
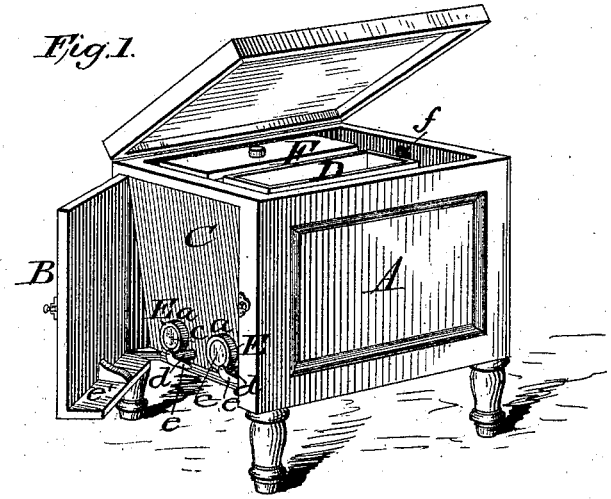
Figure 2:
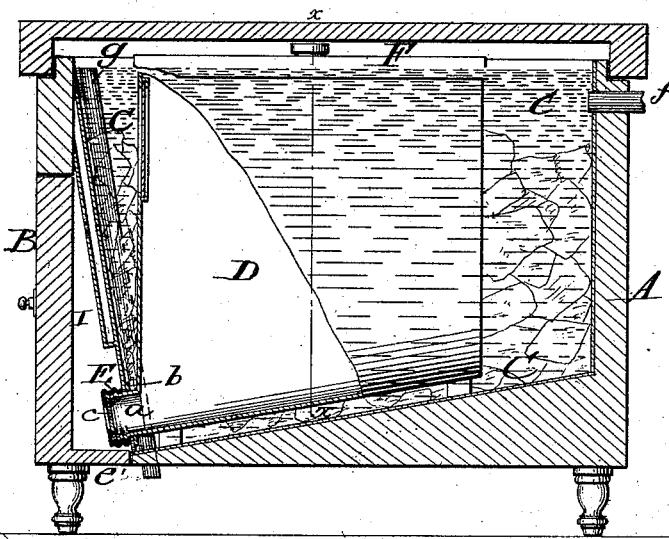
Figure 3:
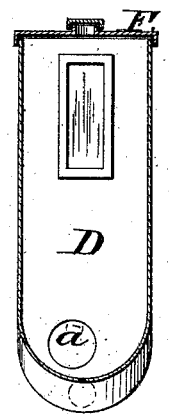
Figure 4:
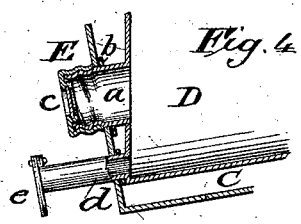

In the accompanying drawings, Figure 1 represents a perspective view of my improved milk-cooler, or "creamery," as they are known to the trade, the end and top being open to show the interior arrangement; Fig. 2, a longitudinal vertical section through the same; Fig. 3, a vertical transverse section of one of the milk-vessels, taken on the line *x x* of Fig. 2; Fig. 4, a detail view, showing the two tubular necks of the milk-vessels with their attachments.

This apparatus is designed for that process of cream-raising in which the rise of the cream is accelerated by the rapid lowering of the temperature of the milk, and in which, also, a separation of the milk and cream is effected by drawing off the milk from beneath the cream after the latter has risen to the top.

The apparatus, as shown in the drawings, consists, primarily, of a chest or box constructed with solid or hollow walls, as may be preferred, a water-tank, usually of galvanized iron, mounted in the chest, and having a sloping bottom and an end slanting inward toward said bottom, and one or more milk-vessels placed within the water-tank and having bottoms of semicircular form in cross-section, inclined from one end to the other. The milk-vessels are located within the water-tank close to one end, in order to afford a large ice-space at the opposite end, are made of the peculiar form mentioned in order that their contents may be caused to flow toward a common point, and are provided with two tubular necks adapted to extend through the end of the water-tank. Of these two necks or tubes one is placed at the bottom of the front end of the milk-vessel, and is furnished, when in position, with a faucet or cock, while the other is furnished with a cap containing a pane of transparent material—commonly glass—to permit the ready observation of the cream-line. The bottom of the water-tank inclines toward one end, to cause the water to run off when an outlet is opened for it, and the end of said tank is inclined slightly inward toward the bottom in order that the caps and gates of the milk-vessels, while being outside of the water-tank, shall still fall within the body of the chest. The end of the chest is hinged to swing outward and expose the caps and the gates, or to swing inward and protect the same from dust and injury; and that portion of the bottom of the chest which extends forward of the water-tank is attached to and moves with the hinged end, thereby leaving a clear space beneath the gates and permitting a vessel to be set close under the same. The covers of the milk-vessels are provided with ventilating-caps, and have their edges extended downward slightly below the water-line, the water being thereby caused to effect a sealing of the joint.

In order to make the above description more clear, I will now refer to the drawings, in which—

A represents a chest provided with a hinged lid or cover, to permit the insertion and removal of the milk-vessels, ice, &c., and provided also with a hinged end or door, B, the purpose of which will presently appear.

Within the chest A is secured a water-tank, C, the bottom of which slopes downward from one end toward the other, the lower end being next to the hinged door or end B, as shown, and again within the water-tank are placed one or more milk-vessels, D. The backwardly-inclined or retreating face of the water-vessel is advantageous, in that it affords between the front of the water-vessel and the inside of the door a space or chamber, I, to receive the cock through which the milk is discharged, as well as the glazed neck, through which the cream-line may be observed, as hereinafter referred to. The milk-vessels are of the peculiar form indicated in Figs. 2 and 3—that is to say, they are rectangular in horizontal section, and are formed with a bottom of semicircular or concave form in cross-section, inclining downward from one end to the other.

Each milk-vessel is furnished at the lowest point of the inclined bottom with a short neck or tube, $a$, projecting from its end, said neck being furnished with a flange, $b$, and being also threaded on its exterior outside of said flange, as shown in Fig. 2. The neck $a$ is passed through a hole or opening provided for it in the end of the water-tank C, and upon the portion of the neck projecting beyond the tank is screwed a cap, E, which, being turned firmly to place, draws the flange $b$ firmly against the inner face of the tank, thereby forming a close water-tight joint.

The cap E is provided with a small transparent pane, $c$, through which the milk may be observed outside of the water-tank. Each milk-vessel is further provided with a second flanged neck or tube, $d$, extending out through the end of the water-tank in the same manner as the tube $a$, and threaded or otherwise adapted to receive a cock or faucet, $e$, through which to withdraw the milk.

In practical use it is found very important that the transparent pane and the draw-off cock or faucet be located outside of the water chamber or tank, in order that the milk may be withdrawn without removing the milk-vessel from the chest or permitting a change of air in the latter, and in order, also, that there may be no water or other medium between the eye of the observer and the transparent pane or eye-piece to interfere with the ready and accurate observation of the cream-line in drawing off the milk, or to prevent the actual condition of the milk from being conveniently ascertained. It is also very important that the discharge-tube and its cock and the observation-tube $a$, with its glazed cap E, be protected as far as practicable from the influence of the outside air, and the transparent pane protected from dust and injury. To secure these results without increasing the size or altering the external appearance of the chest, and without materially decreasing the capacity of the water-tank, said tank has one of its ends inclined inward toward the bottom, as shown in Figs. 1 and 2, thereby bringing the necks $a$ $d$, which extend through said end, within the vertical plane of the upper edge of said end, the space thus provided being sufficient to receive the caps and the draw-off cocks, as shown.

In order to permit ready access to the gates or cocks $e$, the end of the chest A is hinged to swing outward, as shown in Fig. 1, and for the purpose of permitting a vessel to be placed close under the cocks or faucets, that portion of the bottom of the chest $e$ extending forward of the water-tank is secured to and swings with the door or end B, as shown. By this arrangement the projecting necks with their caps and cocks or faucets are inclosed and surrounded, when not actually in use, by a body of confined air, and consequently are but slightly affected by the atmosphere, if at all.

In order to prevent any material effect of the atmosphere upon the contents of the water-tank when the door or end B is open, the exposed end of said tank may be made with a double wall, as shown in Fig. 2. The bottom of the water-tank C slopes downward toward the exposed end, as shown in Figs. 1 and 2, so that by removing the cap and faucet from one of the milk-vessels and withdrawing the latter the water may be discharged through the openings in the end of the tank.

In order that the contents of the milk-vessels may in each be caused to flow to a common point and be completely discharged through the cocks or faucets, each vessel, usually of rectangular form in horizontal section, has its bottom made of semicircular or concave form in cross-section, as shown in Figs. 2 and 3, and inclined from one end to the other, the lowest point being at the mouth of the neck or tube $d$. This peculiar form is advantageous for the reason that the bottom may be bent up or formed of one piece of metal with the sides without seams or joints of any kind, thus avoiding all projections and roughnesses upon which a deposit of any kind might form, and enabling the vessel to be readily cleansed. As shown in Fig. 2, the depending edge of the cover F of the milk-vessel extends below the water-line, thus forming a perfect seal against the admission of air to the interior of the vessel.

An inlet-opening, $f$, and an overflow-tube, $g$, serve, respectively, to permit the entrance and exit of running water commonly used in connection with the apparatus.

I am aware that milk-coolers and cream-raising apparatus have been constructed in many forms combining interior milk-vessels and exterior bodies or casings of different kinds, and my invention is limited to the peculiar construction herein described and shown.

In practice, a suitable quantity of ice is placed at the rear end of the water chamber or tank and water supplied in sufficient quantity or in continuous stream to rise to the top of the overflow-tube $g$, the mouth of which is slightly above the lower edge of the depending flange of the cover. The cover is thus kept continually sealed. By giving the bottoms of the milk-vessels the concave form in cross-section and the downward inclination, and arranging the large space or chamber at the upper end, the apparatus is adapted to receive a large supply of ice and to cause the same to feed downward gradually and uniformly around and beneath the milk-vessel.

I am aware that a vessel designed to contain a fluid and provided with an outlet-cock at one side has been inclosed within a surrounding case or body having a door through which access could be had to the cock, said structure being, however, without any water-vessel or water-jacket to surround the inner vessel, and to such structure I lay no claim.

Having thus described my invention, what I claim is—

1. In a milk-cooling and cream-raising apparatus, the combination of the external body or case, the internal milk-vessel with vertical walls, and the water-jacket or lining C, surrounding the milk-vessel D, and inclining inward at one end to meet the base of the milk-vessel, for the double purpose of affording a space within the body for the outlet-neck and of permitting the water or other cooling medium to surround substantially the entire milk-vessel.

2. The combination of the rectangular body A, having the door B at one end, the lining C, inclined inward from top to bottom opposite the door, and the central milk-vessel, D, mounted within the lining C, and provided at one end with an outlet-neck lying between the lining C and the door, as shown and described.

3. In a milk-cooling and cream-raising apparatus, the exterior non-conducting body or casing provided with a door or inlet at one end, a central milk-vessel therein, an intermediate water-vessel arranged with a space, I, between it and the door, and the outlet-neck, opening laterally from the milk-vessel through the water-vessel into said space.

ALBAN H. REID.

Witnesses:
    THOS. CLOVER,
    GEORGE A. PARSLOW.